United States Patent
Illsley et al.

(10) Patent No.: US 11,161,925 B2
(45) Date of Patent: Nov. 2, 2021

(54) POLYMERIC AMINOACRYLATES

(71) Applicant: SUN CHEMICAL CORPORATION, Parsippany, NJ (US)

(72) Inventors: Derek Ronald Illsley, Bath (GB); Shaun Lawrence Herlihy, Glastonbury (GB); Sean Philip Francis Mayers, Maidstone (GB)

(73) Assignee: Sun Chemical Corporation, Parsippany, NJ (US)

( * ) Notice: Subject to any disclaimer, the term of this patent is extended or adjusted under 35 U.S.C. 154(b) by 143 days.

(21) Appl. No.: 15/777,473

(22) PCT Filed: Nov. 29, 2016

(86) PCT No.: PCT/US2016/063938
§ 371 (c)(1),
(2) Date: May 18, 2018

(87) PCT Pub. No.: WO2017/095786
PCT Pub. Date: Jun. 8, 2017

(65) Prior Publication Data
US 2021/0009738 A1    Jan. 14, 2021

Related U.S. Application Data

(60) Provisional application No. 62/261,902, filed on Dec. 2, 2015.

(51) Int. Cl.
| | |
|---|---|
| *C08F 2/46* | (2006.01) |
| *C08F 2/50* | (2006.01) |
| *C08G 61/04* | (2006.01) |
| *C08F 222/10* | (2006.01) |
| *C09D 11/101* | (2014.01) |
| *C09D 11/107* | (2014.01) |
| *C09D 11/30* | (2014.01) |
| *C09D 135/02* | (2006.01) |

(52) U.S. Cl.
CPC ...... *C08F 222/1063* (2020.02); *C09D 11/101* (2013.01); *C09D 11/107* (2013.01); *C09D 11/30* (2013.01); *C09D 135/02* (2013.01)

(58) Field of Classification Search
CPC . C08F 222/1063; C09D 11/101; C09D 11/30; C09D 11/107; C09D 135/02
USPC .......... 522/36, 33, 6, 189, 184, 71, 1; 520/1
See application file for complete search history.

(56) References Cited

U.S. PATENT DOCUMENTS

| | | | |
|---|---|---|---|
| 3,844,916 A | 10/1974 | Gaske et al. | |
| 3,914,165 A | 10/1975 | Gaske et al. | |
| 3,925,349 A | 12/1975 | Gaske et al. | |
| 3,963,771 A * | 6/1976 | Robson | C07D 295/15 560/171 |
| 5,482,649 A | 1/1996 | Meixner et al. | |
| 2007/0004815 A1 | 1/2007 | Narayan-Sarathy et al. | |
| 2009/0098304 A1 | 4/2009 | Stone et al. | |
| 2010/0048756 A1 | 2/2010 | Loccufier | |
| 2012/0076994 A1* | 3/2012 | Herlihy | C08F 8/00 428/195.1 |
| 2013/0269558 A1 | 10/2013 | Vanmaele et al. | |
| 2014/0050671 A1 | 2/2014 | Zhang | |
| 2018/0298217 A1* | 10/2018 | Monnier | B29C 64/40 |

FOREIGN PATENT DOCUMENTS

| | | |
|---|---|---|
| EP | 1 731 541 A1 | 12/2006 |
| WO | 2014/126720 A1 | 8/2014 |
| WO | 2015/148094 A1 | 10/2015 |

OTHER PUBLICATIONS

Extended European Search Report issued in counterpart EP Application No. 16871343.6, dated Jun. 19, 2019.
Written Opinion of the International Searching Authority issued in PCT/US2016/063938 dated Feb. 2, 2017.
PCT International Search Report issued in PCT/US2016/063938 dated Feb. 2, 2017.
EuPIA Guideline on Printing Inks applied to the non-food contact surface of food packaging materials and articles; Nov. 2011, p. 6.
EuPIA Suitability List of Photo-initiators for Low Migration UV Printing Inks and Varnishes—Feb. 2013.
L.M. Tang (Polymer Journal) (Tohyo) (2005), 37(4) 255-261; Structure, Solution Aggregation and UV Curing of Hyperbranched Poly (ester-amine)s with Terminal Acrylate Groups.
International Preliminary Report issued in PCT/US2016/063938, dated Jun. 5, 2018.

* cited by examiner

*Primary Examiner* — Jessica Whiteley
(74) *Attorney, Agent, or Firm* — Marian E. Fundytus; Ostrolenk Faber LLP.

(57) ABSTRACT

Described herein are polymeric aminoacrylates formed by the reaction of polyalkylene glycol diacrylates with bireactive amines. The polymeric aminoacrylate are comprised of moieties of poly(alkylene glycol) diacrylate and moieties of bireactive amines. Also described herein are energy curable ink and coating compositions that include the described polymeric aminoacrylates. The energy curable ink and coating compositions that include the described polymeric aminoacrylates are well-suited for use in packaging applications where low migration of uncured monomer material after cure is desired, such as in the packaging of foodstuffs, pharmaceuticals, etc.

23 Claims, No Drawings

POLYMERIC AMINOACRYLATES

The present application is a § 371 National Stage application of PCT/US2016/063938 filed Nov. 29, 2016, which claims priority to U.S. provisional patent application No. 62/261,902 filed Dec. 2, 2015, each of which is incorporated herein by reference in its entirety.

BACKGROUND

Polymeric aminoacrylates may be formed by the Michael reaction of acrylates with primary and secondary amines and can participate in energy-induced curing of free radical polymerizable compositions. Aminoacrylates may act as hydrogen donors for type 2-photoinitiators, such as benzophenone and thioxanthone type initiators. Aminoacrylates may also help overcome the effects of oxygen inhibition, which may be a useful attribute when present in low viscosity fluids such as those used in inkjet printing. Oxygen may readily diffuse into a printed ink prior to curing under the action of a radiation source, and may inhibit cure by forming stable non-initiating peroxy radicals by combination with active initiating radicals. Aminoacrylates may react with peroxy radicals, such as possibly by hydrogen transfer, to reform active initiating species thereby helping to overcome the effects of oxygen inhibition.

U.S. Pat. Nos. 3,844,916, 3,914,165, and 3,925,349 describe how non-gelled Michael addition reaction products are obtained by reacting amines comprising at least one amino hydrogen atom with a stoichiometric excess of ethylenic material comprising a polyacrylate.

WO2015/148094 describes the use of alkoxylated monomers in energy-curable low migration fluids, especially those intended for the printing of food packaging.

EP 1 731 541 describes the preparation of aminoacrylates from polyols with primary and/or secondary amines to produce compounds having a reduced tendency to migrate from cured compositions.

U.S. Patent Application Publication No. 2010/0048756 describes the preparation and use of aminoacrylates from the reaction of difunctional acrylate monomers and primary amines in improving the adhesion to plastic substrates.

U.S. Patent Application Publication No. 2007/0004815 describes the synthesis of a urethane acrylate formed from a diol precursor produced by the Michael addition reaction of 1,6-hexanediol diacrylate (HDDA) and a molar excess of ethanolamine.

L. M. Tang (Polymer Journal (Tohyo) (2005), 37(4), 255-261 describes the formation of hyperbranched polymers in a controlled Michael reaction between trimethylolpropane triacrylate (TMPTA) and piperazine.

U.S. Pat. No. 5,482,649 describes the preparation of aminoacrylates, from tri- and tetrafunctional acrylate monomers with ethanolamine.

Energy-curable compositions applied to the non-contact surface of primary or secondary packaging intended for foodstuffs fall within the guidelines set forth in Article 3 of Regulation (EC) No 1935/20041. The regulations require that materials and articles in contact with food:

Shall be manufactured in accordance with good manufacturing practices, so that under normal or foreseeable conditions of use, they do not transfer their constituents to food in quantities which could:
  endanger human health; or
  bring about an unacceptable change in the composition of the food; or
  bring about a deterioration in the organoleptic characteristics thereof.

The European Printing Ink Association (EuPIA) recommends that Article 3 be followed when producing printed matter for food packaging and has provided guidelines for the selection of raw materials to be used in printing inks for food packaging. EuPIA has also published guidelines for the testing of printed matter. Where no SML (specific migration limit) exists for a specific component then the following migration limits apply;

A target migration limit of no concern for non-evaluated substances of 10 ppb [parts-per-billion] is the ultimate objective, to be consistent with other food contact materials.

In particular, a substance is acceptable if its specific migration does not exceed:
  10 ppb, in case of insufficient toxicological data
  50 ppb if the substance is demonstrated not to be genotoxic according to [European Food Safety Agency] Guidance [footnote omitted]
  a value higher than 50 ppb, if supported by favourable toxicological data and/or evaluation done in accordance with EFSA Guidance

*EuPIA Guideline on Printing Inks Applied to the Non-Food Contact Surface of Food Packaging Materials and Articles*, November 2011, page 6.

EuPIA provides guidelines for how to measure the potential level of materials migrating from printed inks. For inks and coatings applied to the non-food contact surface of packaging (i.e. the outer surface), whether that is to the primary packaging or secondary packaging (labels and sleeves), then the most likely route of migration of ink material that may cause contamination of the foodstuff is through set off migration. Set off migration occurs when printed sheets, labels, etc. contact each other, such as when stacked or rolled prior to being used. In this arrangement, the printed ink applied to a non-food contact side of one label or package contacts the food-contact side of another label or package. Materials in the ink may then migrate to the food contact side of the label or packaging, such as by diffusion. Some migratable materials, originating in the ink on the printed surface side, could then be present on the food contact side and may then leach into the food and contaminate same once the package is filled or label is applied.

SUMMARY OF THE INVENTION

Described herein are polymeric aminoacrylates formed by the reaction of polyalkylene glycol diacrylates with bireactive amines. The polymeric aminoacrylate are comprised of moieties of poly(alkylene glycol) diacrylate and moieties of bireactive amines. Also described herein are energy curable ink and coating compositions that include the described polymeric aminoacrylates. The energy curable ink and coating compositions that include the described polymeric aminoacrylates are well-suited for use in packaging applications where low migration of uncured monomer material after cure is desired, such as in the packaging of foodstuffs, pharmaceuticals, etc.

The polyalkylene glycol diacrylates may include polyethylene glycol diacrylate moieties, polypropylene glycol diacrylate moieties, and moieties of copolymers of polyethylene glycol diacrylate and polypropylene glycol diacrylate. The bireactive amine may be a primary amine or an amine having two secondary amine groups.

Applicants have found that cured ink and coating compositions that include the polymeric aminoacrylates described herein contain lesser amounts of uncured monomers than cured ink and coating compositions that do not include the polymeric aminoacrylates described herein. Such compositions include those that contain commercially available aminoacrylates. Applicants have further found that the degree, e.g., amount, of ethoxylation of the present polymeric aminoacrylates, which is present in the polyalkylene glycol moieties of said polymers, may play a role in reducing the amounts of uncured monomers in the cured ink and coating compositions. Such uncured monomers may be other components polymerizable by the free-radical polymerization mechanism, such as other diacrylate monomers and oligomers, for example, dipropylene glycol diacrylate (DPGDA) (among many others).

A bireactive amine is one having two reactive hydrogens, such as an amine compound having either one primary amine group or one having two secondary amine groups. Thus, a bireactive amine has the capacity to react with two acrylate groups. e.g., react with them in a Michael addition reaction. A Michael reaction product preferred herein results from reacting poly(ethylene glycol) diacrylate (PEGDA) with bireactive amine. Another Michael reaction product preferred herein results from reacting poly(propylene glycol diacrylate) (PPGDA) with bireactive amine. In carrying out the Michael addition reaction, it is preferred that a stoichiometric excess of poly(alkylene glycol) diacrylate, e.g., PEGDA or PPGDA, be used, e.g., a molar excess of poly (alkylene glycol) diacrylate relative to the bireactive amine.

The Applicants have found that compared to aminoacrylates formed using tri- and higher-functional monomers (such as triacrylate monomers), the present polymeric aminoacrylates do not gel at higher amine values. With the polymeric aminoacrylates described herein, alternating linear copolymers result from the reaction between the bireactive amine moieties and the difunctional poly(alkylene glycol) diacrylate moieties, thereby allowing significantly higher levels of amine modification than what could be achieved with tri- or higher-functional acrylates having molecular weights comparable to PEGDA and PPGDA.

It is preferred that the amine value of the aminoacrylate adduct is ≥about 10 mgKOH/g, more preferably ≥about 20 mgKOH/g, even more preferably ≥about 30 mgKOH/g, even more preferably ≥about 40 mgKOH/g, and most preferably ≥about 50 mgKOH/g.

DETAILED DESCRIPTION OF THE INVENTION

Disclosed are polymeric aminoacrylates produced by the Michael addition reaction of one or more poly(alkylene oxide) diacrylates, such as poly(ethylene glycol) diacrylates and/or poly(propylene glycol) diacrylates, with one or more bireactive amines, the polymeric aminoacrylates thus comprising moieties of poly(alkylene glycol) diacrylates and bireactive amines. The molecular weight of the poly(alkylene oxide) cores of the poly(alkylene oxide) diacrylate monomers are preferably in the range 100 to 2,000 Daltons, and more preferably in the range 100 to 1,000 Daltons. Any bireactive amine that can react with two equivalents of acrylate may be used. Bireactive amines are amines comprising either a primary amine group or amines comprising two secondary amine groups. Preferred bireactive amines include primary alkyl amines, primary alkanolamines and cyclic amines, such as piperazine. The polymeric aminoacrylates most preferably have amine values of about 40 mgKOH/g or greater. The polymeric aminoacrylates may be used in compositions including energy-curable (free radical) polymerizable components (of which the present polymeric aminoacrylates would be one such component), and are very well suited for inclusion in compositions used in situations where low material migration is required.

Any method of energy curing can be employed in causing the polymerization (e.g., curing) by the free radical mechanism, such as curing by exposure to ultraviolet (UV) energy and to electron beam radiation.

Polymeric aminoacrylates prepared according to the present invention, and especially those based on the Michael reaction of poly(alkylene glycol) diacrylates and bireactive amines, can be prepared at higher amine values than is possible with comparable tri- and higher functional acrylate monomers. The onset of gelation is avoided when using poly(alkylene glycol) diacrylates in the Michael addition reaction. While not wishing to be bound by any theory, this may result from the alternating type polymers that are formed. Thus, amine values of about 50 mgKOH/g or greater can be attained when a polymeric aminoacrylate is formed, for example, by reacting poly(ethylene glycol) diacrylate and ethanolamine. In contrast, when TMPTA and its derivatives (such as highly ethoxylated derivatives) are reacted with ethanolamine, very high viscosity or even gelled products result at amine values of 50 mgKOH/g and less. This is believed to be related to the higher acrylate functionality found in TMPTA (i.e., acrylate functionality of 3). Reacting a difunctional alkoxylated acrylate such as PEGDA in molar excess with a bireactive amine results in a linear difunctional polymer with respect to the polymerizable acrylate groups, while at the same time having increased reactive functionality via the amine groups. This is clearly advantageous as the polymer is multifunctional with respect to the amine and is difunctional with respect to the acrylate. For example, the polymeric reaction product of trimethylolpropane triacrylate including 3 moles of ethoxylation (TMP(EO)$_3$TA) and diethylamine having an amine value of about 200 mgKOH/g would consume, on average, two of the three acrylates per TMP(EO)$_3$TA molecule. In comparison, aminoacrylates prepared according to the present invention always maintain an acrylate functionality of 2, regardless of the amine value of the adduct.

Energy-curable ink and coating compositions that include the polymeric aminoacrylates described herein contain, after curing, significantly lower amounts of uncured monomer when compared to energy curable compositions including commercially available aminoacrylates. While not wishing to be bound by a theory, the Applicants believe that the relatively high degree of alkoxylation found in the polyalkylene glycol diacrylate moieties of the polymeric aminoacrylates in some way contributes to the reduction of unreacted monomer that remains after curing.

Ink and coating compositions as described herein may include the polymeric aminoacrylates in an amount that is >about 2.0 wt % of the free-radical polymerizable components in the composition.

The polymeric aminoacrylates of the present invention can be made at higher amine values than highly ethoxylated tri- and higher-functional monomers of comparable molecular weight. This is the result of the linear condensation type polymer of the present description formed by the reaction of the difunctional polyalkylene glycol diacrylates, such as PEGDA and PPGDA for example, with a bireactive amine. When higher functional acrylate monomers are reacted with bireactive amines, the polymerization may result in crosslinked gelled materials, particularly at higher amine values. This is in contrast to the polymeric aminoacrylates of the present disclosure, where the acrylate functionality of the adduct is two (2).

The Applicants have found that the polymeric aminoacrylates of the present disclosure are well-suited for use in low migration energy-curable ink and coating compositions. Furthermore, the presence of the present polymeric aminoacrylates may have a role in reducing the amount of the components that may possibly migrate out of the composition after the curing of same, which could potentially contaminate a packaged item such as a foodstuff. The Applicants have surprisingly found that the described polymeric aminoacrylates may reduce the amount of uncured monomer in energy-cured coating and ink films. Thus, the described polymeric aminoacrylates are well-suited for inclusion in energy-curable compositions, especially when the composition has to exhibit low component migration. The present polymeric ink and coating compositions may be included in, for example, flexographic and inkjet ink compositions used in sensitive printing and coating applications such as food packaging, pharmaceutical packaging, and personal care packaging, among others. In these situations, it is important to eliminate if not minimize to an acceptable level the amount of components migrating out of the ink and coating composition.

The advantages of the polymeric aminoacrylates described herein are, at least, twofold. The acrylate- and amine-functionality of the described polymeric aminoacrylates, plus their polymeric nature, minimize the potential of migration of the polymeric aminoacrylates out of energy-cured inks/coatings. Further, inclusion of the described polymeric aminoacrylates in ink and coating compositions is shown to be accompanied by a considerable reduction in the amount of uncured monomers in energy-cured inks when compared with commercially available aminoacrylates.

The polymeric aminoacrylates of the present disclosure may also be used in screen printing inks, gravure inks, offset inks, and letterpress inks, among others. The polymeric aminoacrylates of the present invention could be used in inks, coatings, paints, primers, varnishes, etc.

As used herein, "bireactive amine" refers to a primary amine compound, e.g., a compound comprising one primary amine group, or a compound having two secondary amine groups. These compounds have the capacity to react with two acrylate groups. The bireactive amine may further comprise any number of tertiary amine groups, which would not participate in a Michael addition reaction with the diacrylate. Thus, a bireactive amine can undergo an AA-BB type Michael addition type reaction with any diacrylate, forming a linear alternating copolymer structure, e.g., alternating acrylate and amine moieties in the polymer.

The poly(alkylene oxide) cores of the difunctional acrylates can be defined by the following formula:

$$(C_nH_{2n}O)_x \qquad (I)$$

where n is 1 to 6, and x, the average degree of polymerization of the poly(alkylene oxide) core, is 2 to 50, preferably 4 to 25, and yet more preferably 4 to 15. The degree of polymerization (DP) is the number of monomeric units in a macromolecule or polymer or oligomer molecule.

Preferred pol(alkylene oxide) diacrylates are poly(ethylene glycol) diacrylates and poly(propylene glycol) diacrylates, with poly(ethylene glycol) diacrylates being particularly preferred. More preferred poly(ethylene glycol) diacrylates are those having polyethylene glycol cores of molecular weight between about 100 to about 2,000 Daltons, and more preferably about 100 to about 1,000 Daltons.

In addition to the above-described poly(alkylene oxide) diacrylates, other acrylate monomers and oligomers may also be used in producing the polymeric aminoacrylates of the present invention. For example, in a 2-stage process, a 2-fold stoichiometric excess of bireactive amine may be reacted with a tri- or higher functional acrylate core in the first step, followed by reaction with poly(alkylene oxide) diacrylates in a second step. The stoichiometric excess may be greater than 2. It is preferred that the poly(alkylene oxide) diacrylates should form greater than 50% (w/w), and more preferably greater than 75% (w/w), of the total acrylate monomers and oligomers in the preparation of polymeric aminoacrylates according to the invention.

Poly(alkylene glycol) diacrylates are available as commercial products. Any one of these may be used in preparing the polymeric aminoacrylates. They are listed below in Table 1:

TABLE 1

| Supplier | Product Code | Common Acronym | Chemical Structure | Chemical Description |
|---|---|---|---|---|
| KOWA | A-1000 | PEGDA | PEGDA | polyethylene glycol 1000 diacrylate |
| Shin Nakamura | A-1000 | PEGDA | PEGDA | polyethylene glycol 1000 diacrylate |
| KOWA | A-200 | PEGDA | PEGDA | polyethylene glycol 200 diacrylate |
| Shin Nakamura | A-200 | PEGDA | PEGDA | polyethylene glycol 200 diacrylate |
| KOWA | A-400 | PEGDA | PEGDA | polyethylene glycol 400 diacrylate |
| Shin Nakamura | A-400 | PEGDA | PEGDA | polyethylene glycol 400 diacrylate |
| KOWA | A-600 | PEGDA | PEGDA | polyethylene glycol 600 diacrylate |
| Shin Nakamura | A-600 | PEGDA | PEGDA | polyethylene glycol 600 diacrylate |
| DSM-AGI | AgiSyn 2834 | PEGDA | PEGDA | polyethylene glycol 400 diacrylate |
| DSM-AGI | AgiSyn 2835 | PEGDA | PEGDA | polyethylene glycol 600 diacrylate |
| Allnex | Ebecryl 11 | PEGDA | PEGDA | polyethylene glycol 400 diacrylate |
| Miwon | Miramer M280 | PEGDA | PEGDA | polyethylene glycol 400 diacrylate |
| Allnex | Ebecryl 600 | PEGDA | PEGDA | polyethylene glycol 600 diacrylate |

TABLE 1-continued

| Supplier | Product Code | Common Acronym | Chemical Structure | Chemical Description |
|---|---|---|---|---|
| Eternal | EM224 | PEGDA | PEGDA | polyethylene glycol 200 diacrylate |
| Eternal | EM227 | PEGDA | PEGDA | polyethylene glycol 600 diacrylate |
| Eternal | EM228 | PEGDA | PEGDA | polyethylene glycol 300 diacrylate |
| Hitatchi chemicals | FA-240A | PEGDA | PEGDA | polyethylene glycol 400 diacrylate |
| Qualipoly | GM62V40 | PEGDA | PEGDA | polyethylene glycol 400 diacrylate |
| Qualipoly | GM62V60 | PEGDA | PEGDA | polyethylene glycol 600 diacrylate |
| DKSH | LUNA-PEG(200)DA | PEGDA | PEGDA | polyethylene glycol 200 diacrylate |
| Miwon | Miramer M282 | PEGDA | PEGDA | polyethylene glycol 200 diacrylate |
| Miwon | Miramer M284 | PEGDA | PEGDA | polyethylene glycol 300 diacrylate |
| Miwon | Miramer M286 | PEGDA | PEGDA | polyethylene glycol 600 diacrylate |
| Sartomer | SR 259 | PEGDA | PEGDA | polyethylene glycol 200 diacrylate |
| Eternal | EM226 | PEGDA | PEGDA | polyethylene glycol 400 diacrylate |
| Double Bond | PEG(200)DA | PEGDA | PEGDA | polyethylene glycol 200 diacrylate |
| Double Bond | PEG(400)DA | PEGDA | PEGDA | polyethylene glycol 400 diacrylate |
| Double Bond | PEG(600)DA | PEGDA | PEGDA | polyethylene glycol 600 diacrylate |
| IGM | Photomer 4050 | PEGDA | PEGDA | polyethylene glycol 200 diacrylate |
| IGM | Photomer 4054 | PEGDA | PEGDA | polyethylene glycol 400 diacrylate |
| IGM | Photomer 4056 | PEGDA | PEGDA | polyethylene glycol 600 diacrylate |
| Sartomer | SR 344 | PEGDA | PEGDA | polyethylene glycol 400 diacrylate |
| Sartomer | SR 610 | PEGDA | PEGDA | polyethylene glycol 600 diacrylate |
| KOWA | APG-400 | PPGDA | PPGDA | polypropylene glycol 400 diacrylate |
| Shin Nakamura | APG-400 | PPGDA | PPGDA | polypropylene glycol 400 diacrylate |
| KOWA | APG-700 | PPGDA | PPGDA | polypropylene glycol 700 diacrylate |
| Shin Nakamura | APG-700 | PPGDA | PPGDA | polypropylene glycol 700 diacrylate |
| Toagosei | Aronix M-225 | PPGDA | PPGDA | polypropylene glycol 400 diacrylate |
| Toagosei | Aronix M-270 | PPGDA | PPGDA | polypropylene glycol 700 diacrylate |
| Hitatchi chemicals | FA-P240A | PPGDA | PPGDA | polypropylene glycol 400 diacrylate |
| Hitatchi chemicals | FA-P270A | PPGDA | PPGDA | polypropylene glycol 700 diacrylate |
| Qualipoly | GM62S70 | PPGDA | PPGDA | polypropylene glycol 700 diacrylate |
| Miwon | Miramer M2040 | PPGDA | PPGDA | polypropylene glycol 400 diacrylate |
| Miwon | Miramer M2070 | PPGDA | PPGDA | polypropylene glycol 750 diacrylate |

Any amines that are bireactive in the Michael reaction with diacrylate can be employed. The amines may be one or more primary amines, one or more amines having two secondary amine groups, and combinations thereof. Such bireactive amines include, but are not limited to combinations of: primary alkylamines, primary alkanolamines, and cyclic amines, such as piperazine, which contains two secondary amine groups. Particularly preferred are alkanolamines such as ethanolamine and piperazine. Primary alkylamines and alkanolamines may be described by the following formula:

$$H_2NR \quad (II)$$

wherein R is an alkyl, unsubstituted or substituted with hydroxy, alkoxy, tertiary amine and/or aryl.

Cyclic difunctional amines include piperazine and higher homologues thereof may also be used.

Amines which can be used include, but are not restricted to, ethylamine, propylamine, isopropylamine, butylamine, isobutylamine, hexylamine, octylamine, 2-ethylhexylamine, cyclopentylamine, cyclohexylamine, benzylamine, 2-ethoxyethyl amine, 3-ethoxypropylamine, ethanolamine, propanolamine, butanolamine, 2-dimethylaminoethylamine, 2-diethylaminoethylamine, 3-dimethylaminopropylamine, 4-(2-Aminoethyl)morpholine and piperazine. Any combination of one or more bireactive amines may be used in the preparation of the polymeric aminoacrylates of the present invention.

In addition to the bireactive amines described herein, other amine-containing compounds may be used in preparing the polymers as minor components such as mono-reactive amines (e.g. dialkylamines and dialkanolamines), tri-, and higher reactive amines (e.g. ethylene diamine). The bireactive amine component(s) remain the major stoichiometric part of the amines used in preparing the polymers. The amines used in the preparation of the present polymeric aminoacrylates may comprise any combination of mono-, bi-, tri-, and higher reactive amines. It is preferred that the bireactive amine should form greater than 50% and preferably greater than 75% of the molar content of the amine component used in the preparation of the polymeric aminoacrylates of the invention. It should be understood by those skilled in the art that it is conceivable to produce polymeric aminoacrylates of low amine value by the reaction of, for example, a poly(ethylene glycol) diacrylate with tri- and higher functional amines. However, the predominant use of a bireactive amine obviates the potential of forming cross-links and hence gelation of the adduct.

Hydrazines may be used in preparing the polymeric aminoacrylates, particularly bireactive types such as alkyl hydrazines and those formed, for instance, by the reduction of azoalkanes. Minor amounts of higher hydrazines, such as adipic dihydrazide may be used in combination with any bireactive amine compound, so long as the provisos outlined previously regarding higher functional amines are followed.

The Michael reaction between groups of acrylate and amine functionality can proceed in the absence of solvent and catalyst. However, it is often desirable to speed up the reaction by employing a reaction catalyst. Applicants have found that 1,8-diazabicycloundec-7-ene (DBU) is a particularly effective Michael addition catalyst to be used in preparing the described polymeric aminoacrylates.

During the preparation of the described polymeric aminoacrylates, relatively-gentle heating is applied during the reaction, e.g., in the range of about 30° C. to about 80° C. The Applicants have found that a reaction temperature of about 50° C. is particularly well suited for the preparation of the polymeric aminoacrylates. The reaction may be carried out under an inert atmosphere such as nitrogen, although this is merely optional. Preferably, the bireactive amine is added to the poly(alkylene glycol) diacrylate in order to provide an excess of acrylate present throughout the reaction duration. It may be possible to reverse the order and add the diacrylate to the bireactive amine, as long as in doing so a final molar excess of the diacrylate is used.

There is no restriction on the molar ratio of the diacrylate components to the bireactive amines in preparing the described polymeric aminoacrylates, so long as an excess of the di(meth)acrylate is used. Preferably, the molar ratio of the diacrylates to bireactive amine is in the range of about 1.0:0.9 to about 1.0:0.1.

There is no restriction on the amine value of the polymeric aminoacrylates described herein. In one aspect, it is preferable that the amine values be greater than about 10 mgKOH/g, more preferable that the amine values be greater than about 20 mgKOH/g, even more preferable that the amine values be greater than about 40 mgKOH/g. Still even more preferably, the amine values of the polymeric aminoacrylates may be about 50 mgKOH/g or greater. There is no upper limit on the maximum amine value of the polymeric aminoacrylates.

The amine value of a material denotes the equivalent weight of amine, as expressed in milligrams of potassium hydroxide (KOH), in 1 gram of that material. The amine value of a material may be determined titrimetrically. For example, 0.5 g of polymeric aminoacrylate (weighed to 0.01 g) may be dissolved in 50 ml of ethanol. A suitable indicator, such as methyl orange is added, prior to titration with 0.1 or 0.5N HCl. The titre (V) in ml to reach the end point is recorded. Similarly, the titre for a blank is also recorded (B). The amine value would then be determined as:

$$\text{Amine Value}=(V-B)/(\text{weight of sample (g)})\times 56.1 \times N$$

Where N=the normality of the hydrochloric acid solution; and 56.1 is the g/mol of KOH.

Typical structures of the inventive polymeric aminoacrylates, include but are not limited to the following:

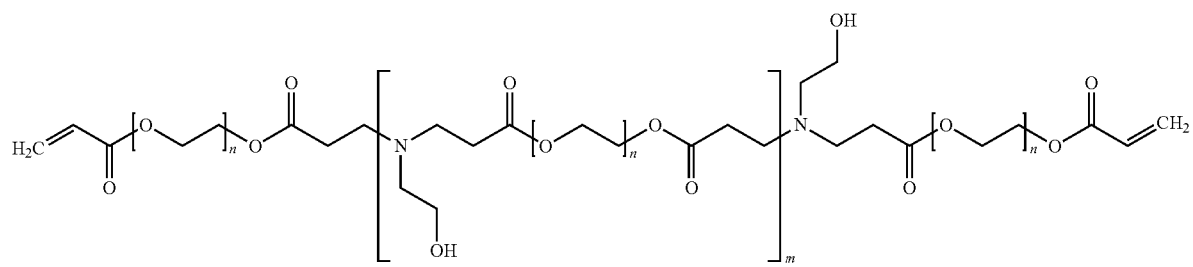

(III)

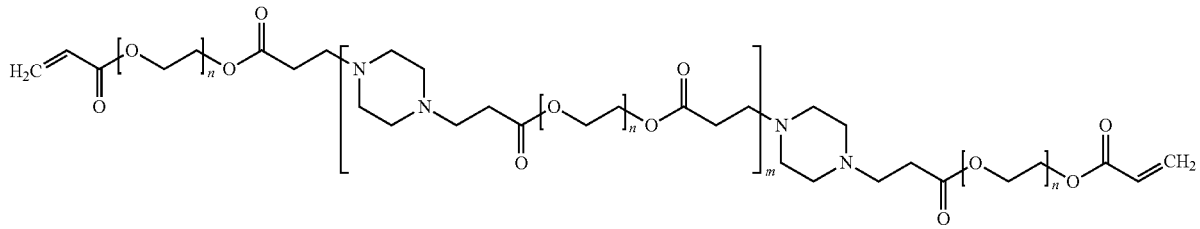

(IV)

In the above formulas, n is 2 to 50, preferably 4 to 25, and yet more preferably 4 to 15; m is 0 to 50, preferably 0 to 25, and more preferably 0 to 15. Formula (III) is representative of the polymeric aminoacrylates of Examples 1 to 6 and 8 to 12. Formula (IV) is representative of the polymeric aminoacrylate of Inventive Example 7. These examples are described later in this description.

A surprising finding with polymeric aminoacrylates of the present invention is that they produce lower amounts of uncured monomer in energy-cured compositions than those Michael adducts produced from conventional monomer diacrylates and triacrylates. While the Applicants do not wish to be bound by any theory, this may be due, at least in part, to the ability of the polymeric aminoacrylates described herein to act as "vitrification control" monomers. To provide for the lowest possible level of uncured, potentially migratable monomers, it is believed that the highest conversion of monomer to polymer should occur during energy-curing. To achieve this, the ink and coating compositions should employ polymerizable monomers or oligomers having functionality leading to a high degree of participation in a polymerization reaction.

In the state of the art for delivering low levels of migratable monomers, the practice is that monomer species having 3 or more polymerizable groups per molecule should be employed, such as the penta- and hexa-acrylated adducts of dipentaerythritol. This practice presumes that higher acrylate (or other polymerizable group) functionality of the monomer or oligomer results in higher crosslink density and thus reduced levels of unbound monomer.

The Applicants have found that cured ink and coating compositions that include the described polymeric aminoacrylates, which have low acrylate functionality (e.g., 2), and which are included in the compositions in relatively low acrylate concentrations, surprisingly include uncured monomers in reduced amounts after energy-curing, e.g., UV-curing, takes place. Uncured monomer is susceptible to migration out of an ink and coating composition. While not wishing to be bound to any theory on why this is the case, it may be that the beneficial effect in the reduction in the amount of uncured monomer may result from the described polymeric aminoacrylates enabling segmental mobility of components in the energy-curing composition, an effect that would not occur, or not occur on the same scale, if the polymeric aminoacrylates were not present. The greater segmental mobility may allow more of the unsaturated sites of the reactive acrylates in the composition to participate in polymerization, leading to higher conversion, e.g., polymerization, of the monomers and oligomers. Again, without being bound by any theory, it may be that ink and coating compositions that do not include the polymeric aminoacrylates described herein reach a state of virtual "vitrification" during the energy curing in which unreacted monomer groups cannot come into sufficiently close proximity to react with each other.

The polymeric aminoacrylates of the present invention can be used in any energy-curable composition and at any concentration. Energy-curing refers to the cure achieved under exposure to various electromagnetic radiation sources producing an actinic effect. Such sources include but are not limited to; electron-beam radiation, ultraviolet (UV)-energy, visible-light, infrared (IR), microwave, and others. Where the compositions are cured under UV energy, UV-energy sources such as the following can be used; high pressure mercury bulbs, medium pressure mercury bulbs, xenon bulbs, excimer lamps, carbon arc lamps, metal halide bulbs, UV-LED lamps, or sunlight. It should be appreciated by those skilled in the art that any UV energy source may be used to cure compositions prepared according to the present invention. The polymeric aminoacrylates of the present invention are especially suited for use in compositions curable under the action of UV energy and/or electron-beam radiation.

The polymeric aminoacrylates described herein may be the sole free radical polymerizable component present in an energy-curable ink and coating composition, though in many instances other free-radical polymerizable components, such as free-radical polymerizable monomers and oligomers, will also be present in the composition. Such other free-radical polymerizable monomers and oligomers may contribute other desirable attributes to the composition, such as scratch resistance, solvent resistance, and toughness, among others. The polymeric aminoacrylates described herein may preferably be present in an amount less than about 75 wt % of a composition, preferably less than 50% wt % of a composition, and more preferably less than 25 wt % of a composition. Such other free-radical polymerizable monomers and oligomers may be, for example, free-radical polymerizable diacrylate monomers and oligomers.

In yet another aspect, the polymeric aminoacrylates may be present in a composition to make an amine value contribution to the composition that is preferably in the range of about 0.5 to about 75 mg KOH/g, more preferably in the range of about 1 to about 50 mgKOH/g, and more preferably in the range of about 2 to about 25 mgKOH/g.

Compositions comprising the polymeric aminoacrylates described herein may also include any amount of one or more additional free radical polymerizable monomers and oligomers. In the following list, the term "ethoxylated" refers to chain extended compounds through the use of ethylene oxide, "propoxylated" refers to chain extended compounds through the use of propylene oxide, and "alkoxylated" refers to chain extended compounds using either or both ethylene oxide and propylene oxide. Equivalent methacrylate compounds are also capable of being used, although methacrylate compounds may generally have lower reactivity than their corresponding acrylate compounds. Suitable compounds include:

isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acylate; stearyl acrylate; iso-stearyl acrylate; behenyl acrylate; tetrahydrofurfuryl acrylate; 4-t.butyl cyclohexyl acrylate; 3,3,5-trim ethylcyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2(2-ethoxyethoxy) ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethylenglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acylate; polyethylene glycol o-phenyl phenyl ether acrylate; ethoxylated p-cumyl phenol acrylate; ethoxylated nonyl phenol acrylate; alkoxylated lauryl acrylate; ethoxylated tri styrylphenol acrylate; N-(acryloyloxyethyl)hexahydrophthalimide; N-butyl 1,2 (acryloyloxy) ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; 4-hydroxy butyl acrylate.

Examples of suitable multifunctional ethylenically unsaturated monomers include but are not limited to the following (and combinations thereof). In the following list, the term "ethoxylated" refers to chain extended compounds through the use of ethylene oxide, "propoxylated" refers to chain extended compounds through the use of propylene oxide, and "alkoxylated" refers to chain extended compounds using either or both ethyleneoxide and propylene oxide. Equivalent methacrylate compounds are also capable of being used, although those skilled in the art will appreciate that methacrylate compounds have lower reactivity than their equivalent acrylate counterparts:

1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3 methyl 1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10 decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate (DPGDA); 3-methylpentanediol diacrylate (3-MePDDA), tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-Vinyloxyethoxy)ethyl acrylate (VEEA); dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxy ethyl) isocyanurate triacrylate; e-caprolactone modified tris (2-hydroxy ethyl) isocyanurate triacrylate; melamine acrylate oligomer; pentaerythritol tetraacrylate; ethoxylated pentaerythritol tetraacrylate; di-trimethylolpropane tetraacrylate; dipentaerythritol pentaacrylate; dipentaerythritol hexaacrylate; ethoxylated dipentaerythritol hexaacrylate.

Examples of monomers comprising free-radical polymerizable groups other than acrylate include N-vinyl amides. Examples of N-vinyl amides include but are not limited to: N-vinylcaprolactam (NVC), N-vinyl pyrollidone (NVP), diacetone acrylamide, N-vinyl oxazolidinone or N-vinyl methoxazolidinone, N-vinyl carbazole, N-acryloxyoxyethylcyclohexanedicarboximide, N-vinyl imidazole, N-vinyl-N-methylacetamide (VIMA) or acryloyl morpholine (ACMO). Vinyl ethers such as 2-(2-vinyloxyethoxy)ethyl(meth)acrylate (VEEA, VEEM), diethylene glycol divinyl ether (DVE2), triethylene glycol divinyl ether (DVE3), ethyl vinyl ether, n-butyl vinyl ether,iso-butyl vinyl ether, tert-butyl vinyl ether, cyclohexyl vinyl ether (CHVE), 2-ethylhexyl vinyl ether (EHVE),dodecyl vinyl ether (DDVE), octadecyl vinyl ether (ODVE), 1-2-butanediol divinyl ether (BDDVE), 1-4, cyclohexanedimethanol divinylether (CHDM-di), hydroxybutyl vinylether (HBVE), 1-4-cyclohexanedimethanolmono vinylether (CHDM-mono), 1,2,4-trivinylcyclohexane (TVCH), vinylphosphonic acid dimethylester (VPA) or vinylphosphonic acid dimethyl ester (VPADME).

The ink and coating compositions described herein, in one aspect, include about 10 wt % or more of difunctional monomers, and about 2 wt % to 25 wt % aminoacrylates.

As well as free radical-polymerizable monomers, the inventive polymeric aminoacrylates may also be compounded with any concentration and type of free-radical polymerizable oligomers, including but not restricted to polyurethane acrylates, polyester acrylates, polyether acrylates and epoxy acrylates.

The amounts of other energy curable monomers, oligomers, polymers, etc. may be included in ink and coating compositions may depend on the amount of polymeric aminoacrylate in a composition. For example, in an inkjet, flexographic ink or varnish, the monomer and oligomer component may be present in an amount greater than about 25 wt % in the composition and more preferably greater than about 50 wt % of the composition. Where the compositions are used for the printing of food labeling/packaging and other sensitive applications such as pharmaceutical and personal care labeling/packaging, then the total amount of monofunctional monomers should be present in an amount less than about 10 wt % of the composition and more preferably in an amount less than about 5 wt % of the composition. Oligomers may be present in an inkjet composition in an amount up to 10 wt % and no more than about 15 wt %. For flexographic inks, oligomers may be present in an amount up to 50 wt %.

Optionally, an amine synergist may be included in the inks and coating compositions. Examples of amine synergists include aromatic amines such as 2-(dimethylamino) ethylbenzoate; N-phenyl glycine; benzoic acid, 4-(dimethylamino)-, 1,1'-[(methylimino)di-2,1-ethanediyl] ester and simple alkyl esters of 4-(N,N-dimethylamino)benzoic acid, with ethyl, amyl, 2-butoxyethyl and 2-ethylhexyl esters being particularly preferred; other positional isomers of N,N-dimethylamino)benzoic acid esters are also suitable;

Aliphatic amines such as N-methyldiethanolamine, triethanolamine and tri-isopropanolamine;

Aminoacrylates and amine modified polyether acrylates may be included such as EBECRYL 80, EBECRYL 81, EBECRYL 83, EBECRYL 85, EBECRYL 880, EBECRYL LEO 10551, EBECRYL LEO 10552, EBECRYL LEO 10553, EBECRYL 7100, EBECRYL P115 and EBECRYL P116 available from ALLNEX; CN501, CN550, CN UVA421, CN3705, CN3715, CN3755, CN381 and CN386, all available from Sartomer; GENOMER 5142, GENOMER 5161, GENOMER 5271 and GENOMER 5275 from RAHN; PHOTOMER 4771, PHOTOMER 4967, PHOTOMER 5006, PHOTOMER 4775, PHOTOMER 5662, PHOTOMER 5850, PHOTOMER 5930, and PHOTOMER 4250 all available from IGM, LAROMER LR8996, LAROMER LR8869, LAROMER LR8889, LAROMER LR8997, LAROMER PO 83F, LAROMER PO 84F, LAROMER PO 94F, LAROMER PO 9067, LAROMER PO 9103, LAROMER PO 9106 and LAROMER P077F, all available from BASF; AGISYN 701, AGISYN 702, AGISYN 703, NeoRad P-81 and NeoRad P-85 ex DSM-AGI.

The inventive polymeric aminoacrylates may be used in the preparation of colored ink and coating compositions. Suitable colorants that can be used to impart color to ink and coating compositions include but are not limited to organic or inorganic pigments and dyes. The dyes include but are not limited to azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

Organic pigments and black pigments may be included in ink jet compositions in an amount in the range of about 1 wt % to about 5 wt %, and white pigments such as titanium dioxide, may be included in an amount in the range of about 10 wt % to about 30% wt %. For flexographic inks, organic pigments and black pigments may be included in the range of about 5 wt % to about 20%; white pigments (e.g., titanium dioxide) may be included in an amount in the range of about 15 wt % to about 35% wt %. For dye-based inks, the dye inclusion would suitably be in the range of about 1 wt % to about 15 wt % of the composition.

Energy-curable ink and coating compositions comprising the inventive polymeric aminoacrylates may also contain other components. Such components include but are not limited to stabilizers, wetting aids, slip agents, inert resins, antifoams, fillers, rheological aids, amine synergists, etc. These additives may be present in amounts up to about 10 wt % of the composition.

Ink and coating compositions comprising the inventive polymeric aminoacrylates may also include an inert acrylic polymer or copolymer and combinations thereof. These polymers are usually prepared by the (thermal) free radical polymerization of blends of monomers including, but not limited to, styrene, butyl (meth)acrylate, ethyl (meth)acrylate, methyl (meth)acrylate, and isobutyl (meth)acrylate. The acrylic polymer preferably has an average molecular weight of less than about 20,000 g/mole and more preferably less than about 10,000 g/mole. The molecular weight of such polymers can be measured by those techniques known in the art such as gel permeation chromatography. Examples of acrylic polymers include those supplied from Dianal, Elvacite, Rohm and Haas and DSM, among others. The acrylic polymer is preferably present in the compositions at a concentration of between about 2 wt % to about 20 wt %, preferably in amounts of about 15 wt % or less.

Ink and coating compositions comprising the polymeric aminoacrylates of the present invention are preferably essentially free of any solvent. However, the compositions may be diluted with solvents, e.g., if it is believed that it is advantageous to use a diluent. Both organic and aqueous solvents may be used to dilute the curable compositions of the invention. The amount of solvent that may be included in an ink and coating composition is about 10 wt % or less.

The described polymeric aminoacrylates are well-suited for inclusion in energy-curable inkjet and flexographic printing inks. The described polymeric aminoacrylates may also be used in energy-curable primers and overprint varnishes. Inks and coating compositions including the present polymeric aminoacrylates are well suited for inclusion in ink and coating compositions to be used in the printing or coating of, for example, food packaging, pharmaceutical packaging, displays in close proximity to foods, personal care packaging, toy packaging, etc.

Low migration energy-curable compositions comprising the inventive polymeric aminoacrylates are preferably cured under the action of electron-beam or UV light.

Photoinitiators may be used to start the UV-curing of the polymerizable materials (e.g., the described polymeric aminoacrylates and other polymerizable monomers, oligomers, polymers included in the ink and coating compositions). Ink and coating compositions including the described polymeric aminoacrylates may also include photoinitiators that become active when exposed to UV-light to initiate the curing reaction in the composition. There is no restriction on the type, combination, or concentration of photoinitiators that may be included, although those recognized as being low migration components are preferred. Photoinitiators may be present in the ink and coating compositions in amounts up to about 10 wt %. The ink and coating compositions may include one or more of the following in any combination:

α-hydroxyketones such as; 1-hydroxy-cyclohexyl-phenyl-ketone; 2-hydroxy-2-methyl-1-phenyl-1-propanone; 2-hydroxy-2-methyl-4'-tert-butyl-propiophenone; 2-hydroxy-4'-(2-hydroxyethoxy)-2-methyl-propiophenone; 2-hydroxy-4'-(2-hydroxypropoxy)-2-methyl-propiophenone; oligo 2-hydroxy-2-methyl-1-[4-(1-methyl-vinyl)phenyl]propanone; bis [4-(2-hydroxy-2-methylpropionyl)phenyl]methane;

2-Hydroxy-1-[1-[4-(2-hydroxy-2-methylpropanoyl) phenyl]-1,3,3-trimethylindan-5-yl]-2-methylpropan-1-one and 2-Hydroxy-1-[4-[4-(2-hydroxy-2-methylpropanoyl)phenoxy]phenyl]-2-methylpropan-1-one;

acylphosphine oxides such as; 2,4,6-trimethylbenzoyl-diphenylphosphine oxide; ethyl (2,4,6-trimethylbenzoyl)phenyl phosphinate; and bis-(2,4,6-trimethylbenzoyl)-phenylphosphine oxide;

α-aminoketones such as; 2-methyl-1-[4-methylthio)phenyl]-2-morpholinopropan-1-one; 2-benzyl-2-dimethylamino-1-(4-morpholinophenyl)-butan-1-one; and 2-dimethylamino-2-(4-methyl-benzyl)-1-(4-morpholin-4-yl-phenyl)-butan-1-one;

thioxanthones such as; 2-4-diethylthioxanthone, isopropylthioxanthone, 2-chlorothioxanthone, and 1-chloro-4-propoxythioxanthone;

benzophenones such as; such as benzophenone, 4-phenylbenzophenone, and 4-methylbenzophenone; methyl-2-benzoylbenzoate; 4-benzoyl-4-methyl diphenyl sulphide; 4-hydroxybenzophenone; 2,4,6-trimethyl benzophenone, 4,4-bis(diethylamino)benzophenone; benzophenone-2-carboxy(tetraethoxy)acrylate; 4-hydroxybenzophenone laurate and 1-[-4-[benzoyl phenyl sulpho]phenyl]-2-methyl-2-(4-methylphenyl sulphonyl)propan-1-one;

phenylglyoxylates such as; phenyl glyoxylic acid methyl ester; oxy-phenyl-acetic acid 2-[hydroxyl-ethoxy]-ethyl ester, or oxy-phenyl-acetic acid 2-[2-oxo-2-phenyl-acetoxy-ethoxy]-ethyl ester;

oxime esters such as; 1-phenyl-1,2-propanedione-2-(O-ethoxycarbonyl)oxime; [1-(4-phenyl sulfanylbenzoyl) heptylideneamino]benzoate, or [1-[9-ethyl-6-(2-methylbenzoyl)carbazol-3-yl]-ethylidene amino] acetate;

Examples of other suitable photoinitiators include diethoxy acetophenone; benzil; benzil dimethyl ketal; titanocen radical initiators such as titanium-bis(η5-2,4-cyclopentadien-1-yl)-bis-[2,6-difluoro-3-(1H-pyrrol-1-yl)phenyl]; 9-fluorenone; camphorquinone; 2-ethyl anthraquinone; and the like. Polymeric photoinitiators and sensitizers are also suitable for inclusion in the ink and coating compositions in which the described polymeric aminoacrylates are present. Such polymeric photoinitiators and sensitizers include, for example, polymeric aminobenzoates (GENOPOL AB-1 or AB-2 from RAHN, Omnipol ASA from IGM or Speedcure 7040 from Lambson), polymeric benzophenone derivatives (GENOPOL BP-1 or BP-2 from RAHN, Omnipol BP, Omnipol BP2702 or Omnipol 682 from IGM or Speedcure 7005 from Lambson), polymeric thioxanthone derivatives (GENOPOL TX-1 or TX-2 from RAHN, Omnipol TX from IGM or Speedcure 7010 from Lambson), polymeric aminoalkylphenones such as Omnipol 910 from IGM; polymeric benzoyl formate esters such as Omnipol 2712 from IGM; and the polymeric sensitizer Omnipol SZ from IGM.

There are a number of low migration potential photoinitiators, as well as the polymeric types described above, that are well suited for used with low migration UV-curable compositions. Such low migration potential photoinitiators may be used in any combination and concentration. Low migration photoinitiators include, but are not limited to polymeric, polymerizable, difunctional, and multifunctional photoinitiators. These kinds of photoinitiators include type I and type II photoinitiators, which are suited for used in low migration ink compositions. Photoinitiators suitable for low migration applications include:

bis(2,4,6-trimethylbenzoyl) phosphine oxide, 1-[4-(2-Hydroxyethoxy)-phenyl]-2-hydroxy-2-methyl-1-propane-1-one, Oligo-[2-Hydroxy-2-methyl-1-((4-(1-methylvinyl)phenyl) propanone], Poly(oxy-1,2 ethanedyil)-alpha-(4-(dimethylamino)benzoyl)-omega-((4-(dimethylamino)benzoyl)oxy)-(9CI), 2-Hydroxy-1-{4-[4-(2-hydroxy-2-methyl-propionyl)-benzyl]-phenyl}-2-methyl-propan-1-one, 2-hydroxy-1-[4-(4-(2-hydroxy-2-methylpropionyl)phenoxy)phenyl]-2-methyl propan-1-one.

The polymeric aminoacrylates may be combined with any photoinitiator suitable for low migration applications. Such photoinitiators may include those identified in the photoinitiator lists set forth in EuPIA's Suitability List of Photoinitiators for Low Migration UV Printing Inks and Varnishes ("suitability list"). The suitability list classifies photoinitiators into Groups 1 and 2, with Group 1 being further classified into subclasses Groups 1A, 1B, and 1C. The photoinitiators listed in Groups 1A and 1B are particularly well-suited for use in the low migration ink and coating compositions that include the polymeric aminoacrylate UV-curable materials described herein. The suitability list, while incorporated by reference, is set forth below:

TABLE 2

Group 1 - For all Packaging Types Group 1A
These photo-initiators have both low migration potential and are supported by toxicological data.
They have recognized migration thresholds and are listed in Annex 6 of the Swiss Ordinance 817.023.21

| Description | CAS No | SML [mg/kg] |
|---|---|---|
| Benzoylbenzoate, esters with branched polyols | | 0.05 |
| 1-(4-[(4-Benzoylphenyl)thio]phenyl)-2-methyl-2-[(4-methylphenyl)sulfonyl]-1-propan-1-one | 0272460-97-6 | 0.05 |
| 2-Benzyl-2-dimethylamino-4-morpholino butyrophenone | 0119313-12-1 | 0.15 |
| Di-ester of carboxymethoxy benzophenone and polytetramethyleneglycol 250 | 0515136-48-8 | 0.6 |
| Di-ester of carboxymethoxy-benzophenone and polyethylene glycol 200 | 0515136-49-9 | 0.6 |
| (Dimethylamino)benzoate, esters with branched polyols | | 0.05 |
| 2-Ethylhexyl-4-dimethylamino benzoate | 0021245-02-3 | 2.4 |
| 2-Hydroxy-1-(4-(4-(2-hydroxy-2-methylpropionyl)benzyl)phenyl-2-methyl-2-propanone | 0474510-57-1 | 0.05 |
| (Methylamino)diethane-2,1-diylbis(4-dimethylamino amino benzoate) | n.a. | 0.05 |
| 2-(4-Methylbenzyl)-2-dimethylamino-1-(4-morpholinophenyl)-1-butanone | 0119344-86-4 | 0.05 |
| Oligo-[2-Hydroxy-2-methyl-1-((4-(1-methylvinyl)phenyl) propanone] | 0163702-01-0 | 0.05 |
| 9-Oxo-9H-thioxanthene-carboxylate, esters with branched polyols | | 0.05 |
| Phenyl bis(2,4,6-trimethylbenzoyl) phosphine oxide | 0162881-26-7 | 3.3 |

TABLE 2-continued

Group 1 - For all Packaging Types Group 1A
These photo-initiators have both low migration potential and are supported by toxicological data.
They have recognized migration thresholds and are listed in Annex 6 of the Swiss Ordinance 817.023.21

| Description | CAS No | SML [mg/kg] |
|---|---|---|
| Poly(oxy-1,4-butanediyl), .alpha.-[2-[(9-oxo-9H-thioxanthenyl)oxy]acetyl]-.omega.-[[2-[(9-oxo-9H-thioxanthenyl)oxy]acetyl]oxy]- | 0813452-37-8 | 0.05 |
| Poly(oxy-1,2 ethanediyl)-alpha-(4-(dimethylamino)benzoyl)-omega-((4-(dimethylamino)benzoyl)oxy)-(9Cl) | 0071512-90-8 | 0.05 |
| Poly[oxy(methyl-12-ethandiyl)], alpha-[4-(di-methylamino)benzoyl-omega-butoxy | 0223463-45-4 | 0.05 |

The following photo-initiators are considered suitable for food packaging use as they have low migration potential and/or high molecular weights but are currently awaiting official evaluation.

TABLE 3

Group 1B These photo-initiators have low migration potential and/or have high molecular weight.
They should not migrate into the food above 10 ppb. NB. It is possible that traces of monomeric
photo-initiators from Group 1C may be present in some of these polymeric products.

| Description | CAS No | Comment/ SML |
|---|---|---|
| {a-2-(Phenylcarbonyl)benzoylpoly(oxyethylene)-poly[oxy(1-methylethylene)]-poly(oxyethylene)} 2-(phenylcarbonyl)benzoate | 1003557-16-1 | >1000 Da |
| {a-4-(Dimethylamino)benzoylpoly(oxyethylene)-poly[oxy(1-methylethylene)]-poly(oxyethylene)} 4-(dimethylamino)benzoate | 1003557-17-2 | >1000 Da |
| 1,3-Di({a-2-(phenylcarbonyl)benzoylpoly[oxy(1-methylethylene)]}oxy)-2,2-bis({a-2-(phenylcarbonyl)benzoylpoly[oxy(1-methylethylene)]}oxymethyl)propane | 1003567-82-5 | >1000 Da |
| 1,3-Di({-4-(dimethylamino)benzoylpoly[oxy(1-methylethylene)]}oxy)-2,2-bis({-4-(dimethylamino)benzoylpoly[oxy(1-methylethylene)]}oxymethyl) propane | 1003567-84-7 | >1000 Da |
| A mixture of:-1,3-di({a-2-(phenylcarbonyl)benzoylpoly[oxy(1-methylethylene)]}oxy)-2,2-bis ({a-2-phenylcarbonyl)-benzoylpoly[oxy(1-methylethylene)]}oxymethyl) propane and{a-2-(phenylcarbonyl)benzoylpoly(oxyethylene)-poly[oxy(1-methylethylene)]-poly(oxyethylene)} 2-(phenylcarbonyl)benzoate | 1003567-82-5 1003557-16-1 | >1000 Da |
| 1,3-di({a-[1-chloro-9-oxo-9H-thioxanthen-4-yl)oxy]acetylpoly[oxy(1-methylethylene)]}oxy)-2,2-bis({a-[1-methylethylene)]}oxymethyl) propane | 1003567-83-6 | >1000 Da |
| A mixture of:-1,3-di({-4-(dimethylamino)benzoylpoly[oxy(1-methylethylene)]}oxy)-2,2-bis ({-4-(dimethylamino)-benzoylpoly[oxy(1-methylethylene)]}oxymethyl) propane and{a-4-(dimethylamino)benzoylpoly(oxyethylene)-poly[oxy(1-methylethylene)]-poly(oxyethylene)} 4-dimethyl-amino)benzoate | 1003567-84-7 1003557-17-2 | >1000 Da |
| Poly{1-[4-(phenylcarbonyl)-4'-(methyldiphenylsulphide)]ethylene} | | >1000 Da |
| Poly{1-[4-(phenylcarbonyl)phenyl]ethylene} | | >1000 Da |
| Mixed polymer based on Benzophenone | | >1000 Da |
| Polymer based on piperazino compounds of aminoalkylphenone | | >1000 Da |
| 1-[4-(2-Hydroxyethoxy)phenyl]-2-hydroxy-2-methyl-1-propanone | 0106797-53-9 | 0.05 mg/kg |
| Diphenyl-(2,4,6-trimethylbenzoyl) phosphine oxide | 0075980-60-8 | 0.05 mg/kg |
| Polymeric Benzophenone derivative | | 0.05 mg/kg |
| Polymeric Thioxanthone derivative | | 0.05 mg/kg |
| Polymeric Aminobenzoate | | 0.05 mg/kg |
| Oxy-phenylacetic acid 2-[2-hydroxy-ethoxy]-ethyl ester | 0442536-99-4 | 0.05 mg/kg |
| Oxy-phenylacetic acid 2-[2-oxo-2-phenyl-acetoxy-ethoxy]-ethyl | 0211510-16-6 | 0.05 mg/kg |

TABLE 4

Group 1C These photo-initiators have been evaluated and have a migration limit in accordance either with Regulation (EU) No 10/2011 and/or Swiss Ordinance 817.023.21. Some market specifiers may request nonuse.

| Description | CAS No | SML |
|---|---|---|
| Benzophenone | 0000119-61-9 | 0.6* |
| Benzophenone, 2-methyl- | 0000131-58-8 | 0.6* |
| Benzophenone, 3-methyl- | 0000643-65-2 | 0.6* |
| Benzophenone, 4-methyl- | 0000134-84-9 | 0.6* |
| Ethyl-4-(dimethylamino)benzoate | 0010287-53-3 | 0.05 |
| 2-Isopropyl thioxanthone | 0005495-84-1 | 0.05 |
| 4-Isopropyl thioxanthone | 0083846-86-0 | 0.05 |
| Methyl-2-benzoylbenzoate | 0000606-28-0 | 0.05 |

TABLE 5

Group 2 - Only to be Used for Packaging (Such as Some Metal Packaging) Where Transfer/Migration of <10 ppb or Other Required Limits can be Achieved These photo-initiators have not been fully evaluated

| Description | CAS No |
|---|---|
| Anthraquinone, 2-ethyl- | 0000084-51-5 |
| 1H-Azepine-1-propanoic acid, hexahydro-, 2,2-bis[[(1-oxo-2-propenyl)oxy]methyl]butyl ester | 0073003-78-8 |
| Benzophenone, 4,4'-bis(diethylamino)- | 0000090-93-7 |
| Bis (eta(5)-cyclopentadienyl)-bis(2,6-difluoro-3-[pyrrol-1-yl]-phenyl)titanium | 0125051-32-3 |
| 2,2-Bis-(2-chlorophenyl)-4,4',5,5'-tetraphenyl-1,2-biimidazolyl | 0007189-82-4 |
| Bis(2,6-dimethoxybenzoyl)-2,4,4-trimethylpentylphosphinoxide | 0145052-34-2 |
| Bis(4-diphenylsulphonium)phenylsulphide-bis (hexafluorophosphate) | 0074227-35-3 |
| Bis(4-dodecylphenyl)iodonium hexafluoroantimonate | 0071786-70-4 |
| Bis-(4-Methylphenyl)-)-iodonium hexafluorophosphate | 0060565-88-0 |
| Bis(4-tert-butylphenyl) iodonium hexafluorophosphate | 0061358-25-6 |
| 4,4'-Bis(methylethylamino)benzophenone | 0194655-98-6 |
| Butoxyethyl-4-(dimethylamino) benzoate | 0067362-76-9 |
| d,l-Camphorquinone | 0010373-78-1 |
| 1-Chloro-4-propoxythioxanthone | 0142770-42-1 |
| 9,10-Dibutoxyanthracene | 0076275-14-4 |
| 2,2-Diethoxy acetophenone | 0006175-45-7 |
| 2,4-Diethyl-9H-thioxanthen-9-on | 0082799-44-8 |
| 2,3-Dihydroxy-6-(2-hydroxy-2-methyl-1-oxopropyl)-1,1,3-trimethyl-3-[4-(2-hydroxy-2-methyl-1-oxopropyl)phenyl]-1H-indene | n.a |
| 2,2-Dimethoxy-2-phenyl acetophenone | 0024650-42-8 |
| 2-(Dimethylamino)ethylbenzoate | 0002208-05-1 |
| 1-[4-(1,1-Dimethylethyl)phenyl]-2-hydroxy-2-methylpropan-1-one | 0068400-54-4 |
| Diphenyl(4-phenylthiophenyl)sulfonium hexafluoro phosphate | 0068156-13-8 |
| Diphenyl[(phenylthio)phenyl]sulfonium hexafluorophosphate | 0075482-18-7 |
| Erbium oxide sulfide (Er2O2S) | 0012345-97-0 |
| 2-Ethylanthraquinone | 0000084-51-5 |
| Ethylbenzoylformate | 0001603-79-8 |
| 2-Hydroxy-[4'-(2-Hydroxypropoxy) phenyl]-2-methylpropanone | n.a. |
| 2-Hydroxy-2-methyl propiophenone | 0007473-98-5 |
| 1-Hydroxycyclohexyl-phenyl-ketone | 0000947-19-3 |
| Iodonium, (4-methylphenyl)[4-(2-methylpropyl) phenyl]-hexafluorophosphate-(1-) | 0344562-80-7 |
| Methylbenzoylformate | 0015206-55-0 |
| [4-(1-Methylethyl)phenyl](4-methylphenyl)-iodonium tetrakis(pentafluorophenyl)borate | 0178233-72-2 |
| 4-(Methylphenylthio)-benzophenone | 0083846-85-9 |
| Mix. of 1-Propanone, 2-hydroxy-2-methyl-1-[4-(1-methylethenyl]phenyl-homopolymer with 2-Hydroxy-2-methyl-1-phenylpropan-1-one | 0149260-52-6 |
| Mixture of: Phenoxyethylacrylate, Methyl-2-benzoylbenzoate, 2-Benzyl-2-(dimethylamino)-4-morpholino butyrophenone, Ethyl-4-Dimethylaminobenzoate | 0048145-04-6/ 0000606-28-0/ 0119313-12-1/ 0010287-53-3 |
| Mixture of 3-(4-(2-Hydroxy-2-methylpropionyl)phenyl)-1,1,3-trimethylindan-6-yl 2-hydroxyprop-2-yl ketone and 3-(4-(2-Hydroxy-2-methylpropionyl)phenyl)-1,1,3-trimethylindan-5-yl 2-hydroxyprop-2-yl ketone | 000402-990-3 |
| Mixture of less 3-(4-(2-Hydroxy-2-methylpropionyl)phenyl)-1,1,3-trimethylindan-6-yl 2-hydroxyprop-2yl ketone and 3-(4-(2-Hydroxy-2-methylpropionyl)phenyl)-1,1,3-trimethylindan-5-yl 2-hydroxyprop-2-yl ketone | 0164578-07-8 |
| Mixture of phenylsulfonium hexafluorophophates <40% | 0617711-03-2 |
| A mixture of: bis[4-diphenylsulfoniumphenyl]sulfide bishexafluoroantimonate; thiophenoxyphenylsulfonium hexafluoroantimonate | 0159120-95-3 |

TABLE 5-continued

Group 2 - Only to be Used for Packaging (Such as Some Metal Packaging)
Where Transfer/Migration of <10 ppb or Other Required Limits can be Achieved
These photo-initiators have not been fully evaluated

| Description | CAS No |
|---|---|
| 1-Phenyl-1,2-propanedione-2-(O-ethoxycarbonyl)oxim | 0065894-76-0 |
| 4-Phenylbenzophenone | 0002128-93-0 |
| Phosphine oxide, triphenyl- | 0000791-28-6 |
| Poly(oxy-1,2-ethanediyl), a-[2-(4-chlorobenzoyl)benzoyl]-w-[[2-(4-chlorobenzoyl)benzoyl]oxy]- | 1007306-69-5 |
| 2-Propenoic acid, (1-methyl-1,2-ethanediyl)bis[oxy(methyl-2,1-ethanediyl)] ester, reaction products with diethylamine | 0111497-86-0 |
| 2-Propenoic acid, 1,6-hexanediyl ester, polymer with 2-aminoethanol | 0067906-98-3 |
| 2-Propenoic acid, 2-ethyl-2-[[(1-oxo-2-propenyl)oxy]methyl]-1,3-propanediyl ester, reaction products with diethylamine | 0068002-34-6 |
| 2-Propenoic acid, polymer with 1,2-ethanediamine, N-ethylethanamine and a,a',a''-1,2,3-propanetriyltris[w-hydroxypoly[oxy(methyl-1,2-ethanediyl)]] | 0144177-00-4 |
| 2-Propenoic acid, polymer with 2,2-bis(hydroxymethyl)-1,3-propanediol, (chloromethyl)oxirane and 4,4'-(1-methylethylidene)bis[phenol], reaction products with diethylamine | 0068002-33-5 |
| 2-Propenoic acid, polymer with 2,2-bis(hydroxymethyl)-1,3-propanediol, 2-(chloromethyl)oxirane and 4,4'-(1-methylethylidene)bis[phenol], reaction products with N-ethylethanamine | 0068797-56-8 |
| 2-Propenoic acid, polymer with 2-aminoethanol, (chloromethyl)oxirane, 2-ethyl-2-(hydroxymethyl)-1,3-propanediol, 4,4'-(1-methylethylidene)bis[phenol] and oxirane | 0194944-42-8 |
| 2-Propenoic acid, polymer with 2-aminoethanol, 1,2-ethanediol and 2-ethyl-2-(hydroxymethyl)-1,3-propanediol | 0156376-93-1 |
| 2-Propenoic acid, polymer with 2-ethyl-2-(hydroxymethyl)-1,3-propanediol and methyloxirane, reaction products with N-ethylethanamine | 0103694-73-1 |
| Reaction product from ethoxylated dipentaerythritol with 10-Biphenyl-4-yl-2-Isopropyl-9-Oxo-9H-Thioanthen-10-ium Hexafluorphosphate | n.a. |
| Thiobis(4,1-phenylene)-S,S,S',S'-tetraphenyldisulfonium bishexafluoroantimonate | 0089452-37-9 |
| Thiophenoxyphenylsulfonium hexafluoro phosphate | 0068156-13-8 |
| 4-Thiophenyl diphenyl sulfonium hexafluoroantimonate | 0071449-78-0 |
| Thioxanthen-9-one, 2-chloro- | 0000086-39-5 |
| 9H-Thioxanthene-2-carboxylic acid, 9-oxo-, ethyl ester | 0083817-60-1 |
| 9H-Thioxanthenium, 10-[1,1'biphenyl]-4-yl-2-(1-methylethyl)-9-oxo, hexafluorophosphate | 0591773-92-1 |
| 2,4,6-Trimethylbenzophenone and others | 0000954-16-5 |
| 2,4,6-Trimethylbenzoylphenylphosphinicacidethylester | 0084434-11-7 |
| Triphenyl sulfonium hexafluorophosphate (mono + di)salts | 0086481-78-9 |
| Triphenylsulfonium hexafluorophosphate | 0104558-95-4 |

The comments above regarding Groups 1, 1A, 1B, 1C and 2 are found in the suitability lists. It should be understood that the comments, in general and as they pertain to any individual photoinitiator species, may not reflect the most up to date information available at the time of filing the present disclosure.

The ink and coating compositions including the described polymeric aminoacrylates can comply with the requirements set forth on page 6 of EuPIA Guideline on Printing Inks Applied to the Non-Food Contact Surface of Food Packaging Materials and Articles. Those requirements are restated below.

A target migration limit of no concern for non-evaluated substances of 10 ppb is the ultimate objective, to be consistent with other food contact materials.

In particular, a substance is acceptable if its specific migration does not exceed:

10 ppb, in case of insufficient toxicological data 50 ppb if the substance is demonstrated not to be genotoxic according to [European Food Safety Agency] Guidance [footnote omitted]

a value higher than 50 ppb, if supported by favourable toxicological data and/or evaluation done in accordance with EFSA Guidance It should be appreciated by those skilled in the art that the polymeric aminoacrylates of the present invention can be used at any concentration in any energy-curable composition. However, it is preferred that the amount of polymeric aminoacrylate found in an ink and coating composition is sufficient to raise the amine value of the composition by a minimum of 1 mgKOH/g and more preferably by more than 2 mgKOH/g.

The invention is further described by the examples given below.

EXAMPLES

The following examples illustrate specific aspects of the present invention and are not intended to limit the scope thereof in any respect and should not be so construed.

Preparation of Aminoacrylates

Examples of polymeric aminoacrylates as described herein and comparative examples of acrylates for purposes of comparison were similarly prepared. The acrylate and amine monomers used in the preparation of each example and comparative example are listed in Table 6. For each preparation, a total combined weight of acrylate monomer (polyalkylene glycol diacrylate in the case of Examples 1-12) and amine of 100 g was used.

To a round-bottomed flask equipped with an overhead stirrer, the acrylate monomer was first charged, along with 0.1 g of DBU as reaction catalyst. While stirring the acrylate monomer, amine was added over a 20 minute period. After the initial reaction exotherm had subsided (typically raising the temperature of the reactor contents by about 10-15° C.), the reactor contents were heated to 50° C. while maintaining stirring. Temperature was maintained at 50° C. until no increase in viscosity had been observed for a period of 2 hours. The product was then discharged.

Ink Preparation

The inks of the examples and comparative examples were prepared by mixing the aminoacrylates with a pigment dispersion and other ink components using a Silverson-type disperser for 20 minutes. The ink compositions are suited for inkjet printing and were prepared in accordance with the procedures set forth in International Published Patent Application no. WO2015/148094, incorporated herein by reference. Tables 7 and 10 show the components of the ink formulations.

Viscosity Measurements

The viscosities of the inks of the examples and comparative examples were measured at 45° C. using a Brookfield DV-II+Pro Viscometer equipped with Spindle no. 18, at 100 rpm.

Curing the Inks for Extraction Testing

The inks of the examples and comparative examples were applied using a #2 K Bar (RK Print) to 36 μm Melinex S, a polyester film substrate at 12 μm and then cured at 200 mJ/cm$^2$, using a Fusion UV Systems UV-Rig equipped with a medium pressure H-bulb. The belt speed was adjusted to deliver a UV-dose of 200 mJ/cm$^2$, as measured by a calibrated International Light Technologies ILT 490 Profiling Belt Radiometer (covering the UV-A and UV-B ranges).

Assessing the Level of Extractable Monomer and Photoinitiator Residues

The level of unbound monomer in a print made from the inks of the examples and comparative examples was determined by a total extraction test in which 30 cm$^2$ of the print is soaked in 2 ml of methanol containing 0.025% (w/w) of mono methyl ether of hydroquinone (MEHQ) stabilizer for 24 hours at room temperature. The methanol solution was analyzed by gas chromatography-mass spectrometry (GC-MS) to determine if unbound monomer migrated into the methanol solution. The GC-MS was calibrated with known solutions of monomers and photoinitiator products used in the examples. The equivalent amount of unbound monomer that would be present in 1 kg of food according to the EU packaging model (where it is assumed that 600 cm$^2$ of substrate is required to package 1 kg of food) is reported as parts-per-billion (ppb).

Assessing the Cure Response of the Inks

The cure response of the inks was determined by applying 12 μm films to Leneta opacity charts (Form 2A) using calibrated K-Bars (ex. RK Print). The coated charts were then passed through a Fusion UV Systems UV-Rig equipped with a medium pressure H-bulb. The belt speed was adjusted so that the UV-dose, as measured by a calibrated International Light Technologies ILT 490 Profiling Belt Radiometer (covering the UV-A and UV-B ranges) was about 50 mJ/cm$^2$ for each pass. The cumulative amount of energy for all passes through the UV-Rig required to achieve both surface and through cure was recorded. The surface cure was assessed by gently drawing a cotton wool bud across the surface of the print, full cure being determined as being the point at which no surface defects were observed. Through cure was assessed by dragging a 1.5 mm wide wooden dowel across the surface of the ink with an approximate downward load of about 5 kg. Through cure was determined as being the point at which the dowel was not able to penetrate through to the underlying surface of the Leneta Chart.

Assessing the Odor of Cured Inks

Ink prints prepared according to the method described for extraction and migration testing were assessed for their odor. For this, five (5) prints of each ink were prepared and then the coated PET films were stacked on top of each other. After 24 hours, prints from the middle of the stack were taken and assessed for odor. A score of 1 to 6 was subjectively assigned to each print, where 1 denotes insignificant odor and 6 denotes a strong unpleasant odor emanating from the print.

Table 6 identifies the monomer and amine used in preparing the aminoacrylates of Comparative Examples 1-4 and Examples 1-7. The comparative examples employ alkoxylated triacrylate monomers and the examples employ poly (ethylene glycol) diacrylate) as the acrylate monomer. The amines employed are as listed, and the theoretical amine value of the Michael addition product is also listed.

TABLE 6

| Example | Monomer | Amine | Amine Value of Aminoacrylate (mgKOH/g) |
|---|---|---|---|
| Comparative Example 1 | TMP(EO)$_3$TA | Diethylamine | 50 |
| Comparative Example 2 | TMP(EO)$_3$TA | Dipropylamine | 50 |
| Comparative Example 3 | TMP(EO)$_3$TA | Ethanolamine | 50 |
| Comparative Example 4 | TMP(EO)$_{15}$TA | Ethanolamine | 50; gelled |
| Example 1 | PEG200DA | Ethanolamine | 50 |
| Example 2 | PEG200DA | Ethanolamine | 75 |
| Example 3 | PEG200DA | Ethanolamine | 100 |
| Example 4 | PEG400DA | Ethanolamine | 50 |
| Example 5 | PEG400DA | Ethanolamine | 75 |
| Example 6 | PEG600DA | Ethanolamine | 50 |
| Example 7 | PEG400DA | Piperazine | 100 |

TMP(EO)$_3$TA=Trimethylolpropane triacrylate having 3 moles of ethoxylation. TMP(EO)$_{15}$TA=Trimethylolpropane triacrylate having 15 moles of ethoxylation.

The 200, 400 and 600 in the PEGDA monomers identify the molecular weight of the polyethylene glycol component of the monomer in Daltons. Higher amine value in some examples of the polymeric aminoacrylates was attained by increasing the concentration of ethanolamine used in the Michael addition reaction.

Inventive Examples 1-6 and also 8-12 are polymeric aminoacrylates have the polymer structure shown above in formulas III and IV.

From Table 6, it can be seen that the polymeric aminoacrylates produced from poly(ethylene glycol) diacrylates can be prepared at significantly higher amine values than TMPTA including 3 or more moles of ethoxylation as a result of forming linear structures rather than possibly forming a cross-linked gel. The degree of acrylate functionality would appear to play a role here.

The above prepared aminoacrylates, along with the commercial aminoacrylate Ebecryl LEO 10553 (based on dipropylamine, and having an amine value of about 65 mgKOH/g, ex. Allnex), were formulated into inks suitable for inkjet printing according to the composition shown in Table 7.

TABLE 7

| Material | % |
|---|---|
| VEEA | 30.0 |
| 3-MePDDA | 25.0 |
| DPGDA | 21.8 |
| Aminoacrylate | 7.5 |
| Irgacure 819 | 0.6 |
| KIP160 | 2.0 |
| Esacure One | 2.0 |
| Omnipol TX | 1.5 |
| TegoGlide 410 | 0.4 |
| Ethanox | 0.2 |
| Cyan Dispersion | 9.0 |
| Total | 100.0 |

DESCRIPTIONS

VEEA=2-(2-vinyloxyethoxy)ethyl acrylate;
3-MePDDA=3-Methylpentanediol diacrylate;
DPGDA=Dipropylene glycol diacrylate;
Aminoacrylate—the aminoacrylate in Comparative Examples 1-4 or Examples 1-7;
Irgacure 819=Photoinitiator (ex. BASF);
Esacure KIP160=Photoinitiator (ex. Lamberti);
Esacure One=Photoinitiator (ex. Lamberti);
Omnipol TX=Polymeric Thioxanthone (ex. IGM Resins);
Ethanox 4703=Stabilizer (ex. Albemarle);
TegoGlide 410=Slip Aid (ex. Evonik);
Cyan Dispersion=a dispersion containing 25.0% (w/w) of Pigment Blue 15:4, the remainder comprising the dispersant (Efka 7476), stabilizers and NPG(PO)DA;
NPG(PO)DA=Propoxylated neopentylglycol diacrylate (degree of propoxylation=2).

Table 8 provides the results of the various tests carried out on the inks.

Table 8 shows that the ink composition including commercial aminoacrylate Ebecryl LEO10553, the inks of the comparative examples, and the ink compositions including the described polymeric aminoacrylates of Examples 1-7 exhibit similar viscosity values. After printing and curing, the inks of Examples 1-7 are less odorous than the LEO10553 ink and the inks of Comparative Examples 1-3. Further, the ink compositions of Examples 1-7 contain significantly lower amounts of uncured (potentially migratable) monomers than the amounts of uncured monomers found in the Ebecryl LEO10553 ink and the comparative example inks.

Of particular note is that the ink compositions including the described polymeric aminoacrylates of each of Examples 1-7 have lesser amounts of uncured monomer than present in the ink composition including the aminoacrylate of Comparative Example 3, which aminoacrylate is the product of TMP(EO)3TA and ethanolamine at the same amine value as the inventive examples.

A further set of polymeric aminoacrylates as described herein were prepared. The PEGDA "monomer", the amine, and the theoretical amine value of the resulting polymeric aminoacrylate examples are set forth in Table 9.

TABLE 9

Polymeric Aminoacrylates of Examples 8-12

| Example | Monomer | Amine | Amine Value of Polymeric Aminoacrylate (mgKOH/g) |
|---|---|---|---|
| Example 8 | PEG600DA | Ethanolamine | 48 |
| Example 9 | PEG200DA | Ethanolamine | 37 |
| Example 10 | PEG400DA | Ethanolamine | 28 |
| Example 11 | PEG200DA | Ethanolamine | 69 |
| Example 12 | PEG400DA | Ethanolamine | 37 |

Ink compositions including the polymeric aminoacrylate of Examples 8-12 were prepared in accordance with the formulation set forth in Table 10. The amine value of the ink composition was set at 6 mgKOH/g. The inks had the following composition, which again followed the principles laid out in WO2015/148094, incorporated herein by reference.

TABLE 8

Performance of Aminoacrylates in UV-Curable Inkjet Compositions

| Aminoacrylate | Ink Viscosity @ 45° C. (mPa·s) | Print Odor | Extractable NPGPODA (ppb) | Extractable DPGDA (ppb) | Extractable 3-MePDDA (ppb) | Extractable VEEA (ppb) |
|---|---|---|---|---|---|---|
| LEO10553 | 6.60 | 4 | 470 | 285 | 250 | 135 |
| Comparative Example 1 | 6.15 | 5 | 285 | 180 | 155 | 76 |
| Comparative Example 2 | 6.18 | 4 | 330 | 175 | 145 | 79 |
| Comparative Example 3 | 7.62 | 3.5 | 110 | 53 | 42 | 19 |
| Example 1 | 6.60 | 2.5 | 19 | 12 | 7 | 8 |
| Example 2 | 6.90 | 2.5 | 40 | 26 | 13 | 13 |
| Example 3 | 8.91 | 2 | 11 | 7 | 4 | 5 |
| Example 4 | 7.71 | 3 | 45 | 20 | 10 | 12 |
| Example 5 | 9.78 | 2.5 | 15 | 8 | 4 | 7 |
| Example 6 | 9.54 | 3 | 30 | 18 | 15 | 12 |
| Example 7 | 8.25 | 2 | 12 | 9 | 5 | 9 |

TABLE 10

| Material | % |
|---|---|
| VEEA | 25.0 |
| 3-MePDDA | 30.0 |
| DPGDA | 8.2-26.4[1] |
| Aminoacrylate (Examples 8-12) | 3.0-21.2[2] |
| Irgacure 819 | 1.0 |
| KIP160 | 2.0 |
| Esacure One | 2.0 |
| Omnipol TX | 1.0 |
| TegoGlide 410 | 0.4 |
| Ethanox | 0.2 |
| CPT1506 | 9.0 |
| Total | 100.0 |

[1] The % of DPGA was adjusted to compensate for the % acrylated amine such that the total % for each example = 100%
[2] See Table 11.

For purposes of comparing to inks including the polymeric aminoacrylates of Examples 8-12, comparative ink compositions were prepared that include the following commercial aminoacrylates; CN3715LM and CN3755 (both ex. Arkema), Ebecryl LEO10551 and LEO10552 (from Allnex). LEO10551 is similar to Comparative Example 2 but has an amine value of about 70. LEO10552 is similar to Comparative Example 3 but has an amine value of about 53.

Table 11 lists the amount of each aminoacrylate included in each ink on a weight % basis, the amount being selected to provide each ink composition with an equivalent amine value of 6 mgKOH/g. Table 11 further lists the viscosity exhibited by each ink and the and the results for the surface cure, through cure, and the print odor. Table 12 provides the results for the levels of uncured monomer as determined from the solvent extraction testing.

TABLE 11

Inks Prepared at an Amine Value of 6.0 mgKOH/g

| Aminoacrylate | Concentration of Aminoacrylate in Ink (% (w/w)) | Viscosity @ 45° C. (mPa · s) | Print Odor | Surface Cure (mJ/cm$^2$) | Through Cure (mJ/cm$^2$) |
|---|---|---|---|---|---|
| CN3715LM | 3.0 | 5.6 | 4 | 150 | 100-150 |
| CN3755 | 4.3 | 6.8 | 2.5 | 100 | 50-100 |
| LEO10551 | 8.0 | 6.2 | 3.5 | 150 | 100 |
| LEO10552 | 11.3 | 7.7 | 2.5 | 100-150 | 50 |
| Example 8 | 12.5 | 11.8 | 3.0 | 100 | 50 |
| Example 9 | 16.1 | 7.0 | 2.0 | 100 | 50 |
| Example 10 | 21.2 | 9.4 | 2.0 | 50-100 | 50 |
| Example 11 | 8.7 | 7.1 | 2.0 | 100 | 50 |
| Example 12 | 16.1 | 7.3 | 2.0 | 100 | 50-100 |

The results in Table 11 show that prints made from ink compositions including the polymeric aminoacrylates of Examples 8-12, formulated to provide the same amine value as the inks that include CN3715LM, CN3755, LEO10551, and LEO10552 (which include tertiary amines) exhibit an enhanced UV-cure response, and that the prints made therefrom are less odorous.

TABLE 12

Amount of Uncured Monomer in UV-Cured Inks Prepared at an Amine Value of 6.0 mgKOH/g

| Aminoacrylate | Extractable NPGPODA (ppb) | Extractable DPGDA (ppb) | Extractable 3-MePDDA (ppb) | Extractable VEEA (ppb) |
|---|---|---|---|---|
| CN3715LM | 275 | 160 | 149 | 69 |
| CN3755 | 26 | 10 | 6 | 4 |
| LEO10551 | 115 | 37 | 37 | 13 |
| LEO10552 | 15 | 5 | 4 | 3 |
| Example 8 | <3 | <3 | <3 | <3 |
| Example 9 | <3 | <3 | <3 | <3 |
| Example 10 | <3 | <3 | <3 | <3 |
| Example 11 | 3 | <3 | <3 | <3 |
| Example 12 | 7 | <3 | <3 | <3 |

The results provided in Table 12 show the benefit of formulating ink compositions including aminoacrylates having ethanolamine as the amine component, as evidenced by the results for CN3755 and LEO10552. Further demonstrated is that prints made from the ink compositions including the polymeric aminoacrylates of the inventive Examples 8-12 contain significantly reduced amounts of uncured monomer after energy-curing the free radical polymerizable ink compositions.

The polymeric aminoacrylates and compositions including same that are regarded as inventive have been described in detail, including preferred embodiments thereof. However, it will be appreciated that those having skill in the art, upon consideration of the present disclosure, may make modifications and/or improvements on this invention that fall within the scope and spirit of the invention.

What is claimed is:

1. A polymeric aminoacrylate comprising moieties of poly(alkylene glycol) diacrylate and moieties of bireactive amine, wherein poly(alkylene oxide) cores of the poly(alkylene glycol) diacrylate moieties have the formula: $(C_nH_{2n}O)_x$, where n is from 1 to 6 and x is from 2 to 50, and wherein the bireactive amine moieties are selected from primary alkyl amines, primary alkanolamines, primary alkoxyamines, primary alkylamines substituted with tertiary amine, primary alkylamines substituted with aryl, heterocyclic amines having two secondary amine groups, and combinations thereof.

2. The polymeric aminoacrylate of claim 1, wherein the poly(alkylene glycol) diacrylate moieties are poly(ethylene glycol) diacrylate moieties.

3. The polymeric aminoacrylate of claim 1, wherein the poly(alkylene glycol) diacrylate moieties are poly(propylene glycol) diacrylate moieties.

4. The polymeric aminoacrylate of claim 1, wherein the poly(alkylene glycol) diacrylate moieties are copolymers of poly(ethylene glycol) diacrylate and poly(propylene glycol) diacrylate.

5. The polymeric aminoacrylate of claim 1, further comprising one or more additional moieties selected from diacrylate moieties, triacrylate moieties, and tetraacrylate moieties.

6. The polymeric aminoacrylate of claim 1, wherein the bireactive amine moieties are derived from primary amines, amines having two secondary amine groups, and combinations thereof.

7. The polymeric aminoacrylate of claim 3, wherein the bireactive amine moieties are selected from ethylamine, propylamine, isopropylamine, butylamine, isobutyl amine, hexylamine, octylamine, 2-ethylhexylamine, cyclopentylamine, cyclohexylamine, benzyl amine, 2-ethoxyethylamine, 3-ethoxypropylamine, ethanolamine, propanol amine, butanolamine, 2-dimethylaminoethylamine, 2-diethylaminoethylamine, 3-dimethylaminopropylamine, 4-(2-aminoethyl)morpholine and piperazine, and combinations thereof.

8. The polymeric aminoacrylate of claim 1, wherein the bireactive amine moieties derive from ethanolamine or piperazine.

9. The polymeric aminoacrylate of claim 1, wherein poly(alkylene oxide) cores of the poly(alkylene glycol) diacrylate moieties have the formula: $(C_nH_{2n}O)_x$, where n is 1 to 6 and x is from 4 to 25.

10. The polymeric aminoacrylate of claim 1, wherein the acrylate functionality of the polymeric aminoacrylate is 2.

11. The polymeric aminoacrylate of claim 1, wherein the amine value is about 10 mgKOH/g or greater.

12. The polymeric aminoacrylate of claim 1 comprising a polymer formed by a Michael addition reaction between the poly(alkylene glycol) diacrylate and the bireactive amine.

13. The polymeric aminoacrylate of claim 1, wherein in the Michael addition reaction, the poly(alkylene glycol) diacrylate and bireactive amine are present in a molar ratio of poly(alkylene glycol) diacrylate:bireactive amine of about 1.0:0.9 to about 1.0:0.1.

14. An energy curable ink or coating composition comprising the polymeric aminoacrylate of claim 1.

15. The energy curable ink or coating composition of claim 14, further comprising at least one free-radical polymerizable monomer or oligomer.

16. The energy curable ink or coating composition of claim 15, wherein the at least one free-radical polymerizable monomer or oligomer is a diacrylate.

17. The energy curable ink or coating composition of claim 14, further comprising at least one colorant.

18. The energy curable ink or coating composition of claim 14, further comprising at least one photoinitiator.

19. The energy curable ink or coating composition of claim 14, wherein the ink or coating composition contains about 100 ppb or less migratable components after curing the ink or coating composition.

20. The energy curable ink or coating composition of claim 14, wherein the ink or coating composition contains about 50 ppb or less migratable components after curing the ink or coating composition.

21. The energy curable ink or coating composition of claim 14, wherein the ink or coating composition contains about 10 ppb or less migratable components after curing the ink or coating composition.

22. The polymeric aminoacrylate of claim 1, wherein the bireactive amine moieties are selected from primary alkanolamines and primary alkoxyamines.

23. The polymeric aminoacrylate of claim 1, wherein the bireactive amine moieties derive from ethanolamine.

* * * * *